Figure 1:
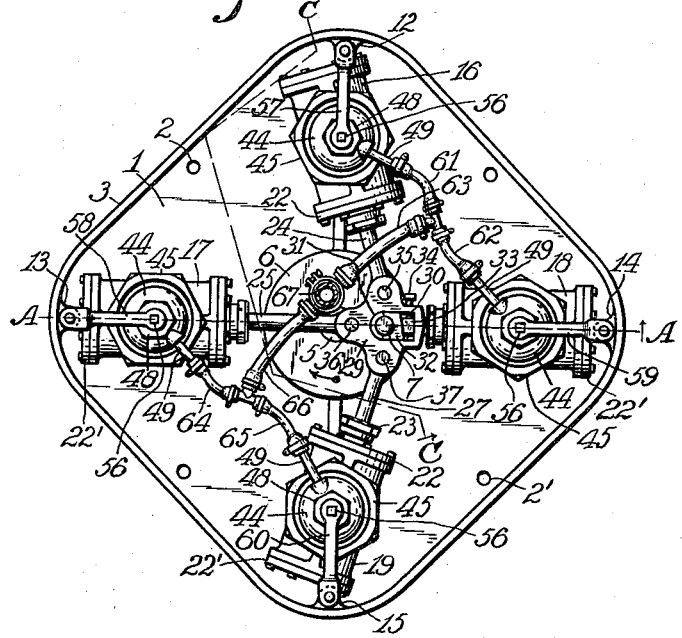

N. B. MITCHELL & J. W. TAGGART, Sr.
ENGINE.
APPLICATION FILED MAR. 16, 1912.

1,060,202.

Patented Apr. 29, 1913.

3 SHEETS—SHEET 1.

WITNESSES:
Alice R. Stogsdill.
G. M. Mapes.

INVENTORS:
Nelson B. Mitchell,
John W. Taggart, Sr.
By E. T. Silvius,
ATTORNEY.

N. B. MITCHELL & J. W. TAGGART, Sr.
ENGINE.
APPLICATION FILED MAR. 16, 1912.
1,060,202.
Patented Apr. 29, 1913.
3 SHEETS—SHEET 2.
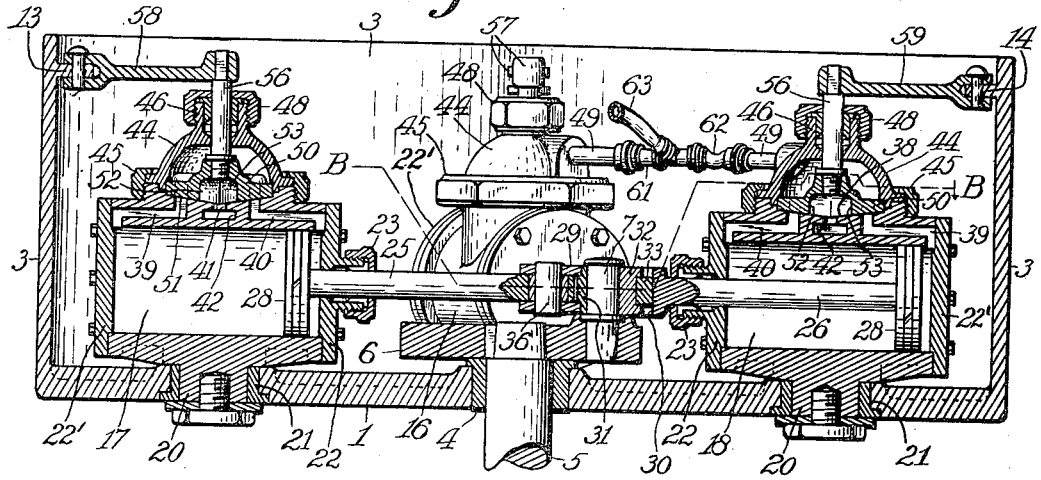
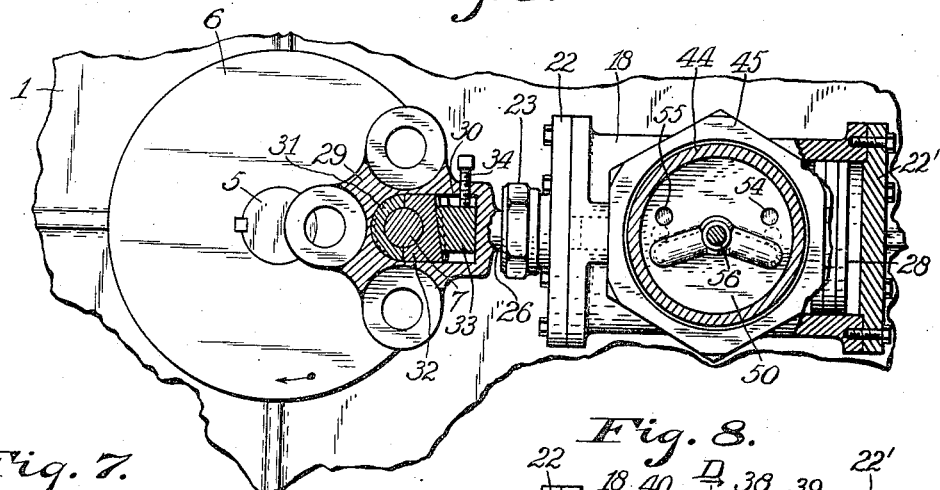
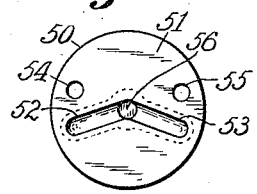
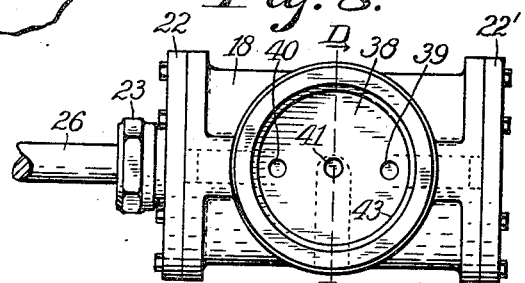
WITNESSES:
Alice R. Stogsdill
G. M. Mapes.
INVENTORS:
Nelson B. Mitchell,
John W. Taggart, Sr.
By E. T. Silvius,
ATTORNEY.

N. B. MITCHELL & J. W. TAGGART, Sr.
ENGINE.
APPLICATION FILED MAR. 16, 1912.
1,060,202.
Patented Apr. 29, 1913.
3 SHEETS—SHEET 3.
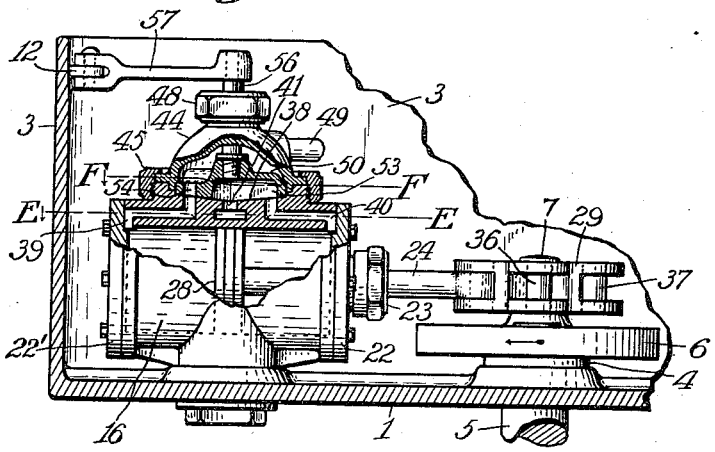
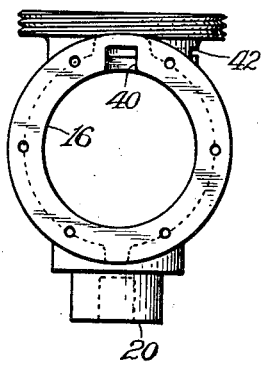
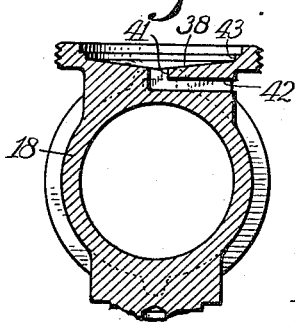
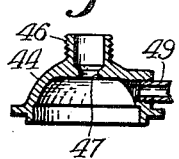
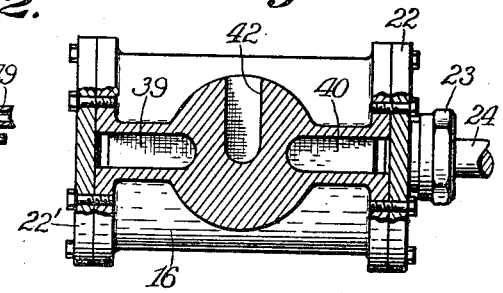
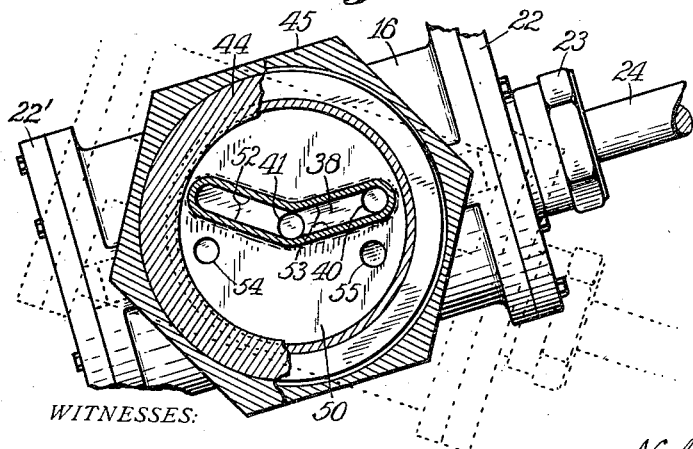
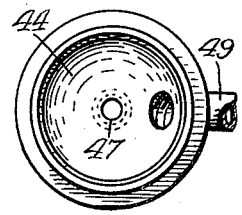
WITNESSES:
Alice R. Stogsdill.
G. M. Mapes.
INVENTORS:
Nelson B. Mitchell,
John W. Taggart, Sr.
By E. T. Silvius,
ATTORNEY.
COLUMBIA PLANOGRAPH CO., WASHINGTON, D. C.

UNITED STATES PATENT OFFICE.

NELSON B. MITCHELL AND JOHN W. TAGGART, SR., OF INDIANAPOLIS, INDIANA, ASSIGNORS OF ONE-THIRD TO ULRICH G. REDELMANN, OF INDIANAPOLIS, INDIANA.

ENGINE.

1,060,202.   Specification of Letters Patent.   Patented Apr. 29, 1913.

Application filed March 16, 1912. Serial No. 684,213.

*To all whom it may concern:*

Be it known that we, NELSON B. MITCHELL and JOHN W. TAGGART, Sr., citizens of the United States, residing at Indianapolis, in the county of Marion and State of Indiana, have invented a new and useful Engine, of which the following is a specification, reference being had to the accompanying drawing and to the letters and figures of reference marked thereon.

This invention relates to fluid-pressure engines including the valves thereof for controlling the action of the fluid, the invention having reference more particularly to oscillating engines in which either compressed air or steam may be utilized as the motive force.

The primary object of the invention is to provide an improved engine of the above-mentioned character, more especially an oscillating engine that shall be so constituted as to be adapted to be cheaply constructed of few and simple parts, which engine shall be capable of developing high power and speed with the minimum expenditure of the motive fluid.

A further object is to provide an improved engine of such design as to be adapted to be manufactured in relatively small sizes for various purposes where compressed air is available for use, especially in situations necessitating the frequent carrying of the engine, as when used for operating portable saws.

A still further object is to provide a simple and effective compressed air engine that shall be suitable for use in the forests without requiring the services of experts or engineers for operating and maintaining them.

The invention consists in improvements in a quadruple-cylinder engine having a single driving shaft and crank and connections for applying the power developed in the cylinders to the driving shaft.

The invention consists also in the novel parts and in the combinations and arrangements of parts as is hereinafter particularly described and pointed out in the accompanying claims.

Figure 2:
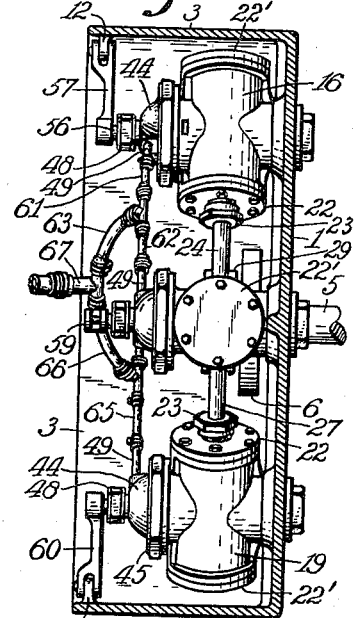
Figure 3:
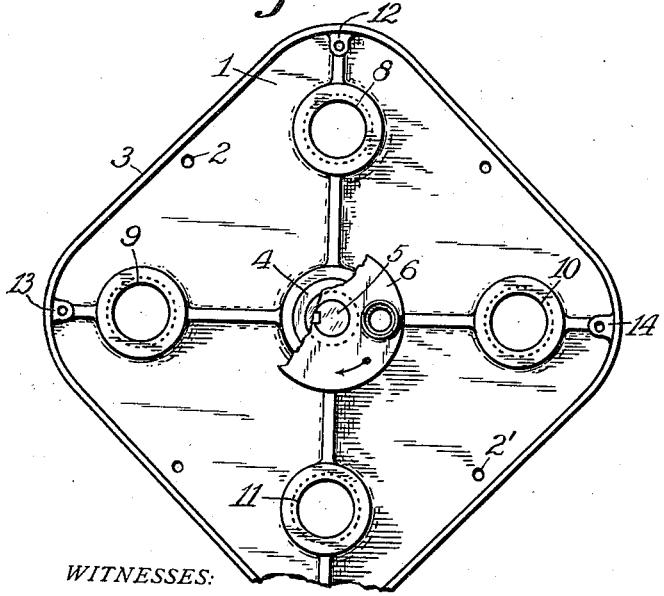
Figure 4:
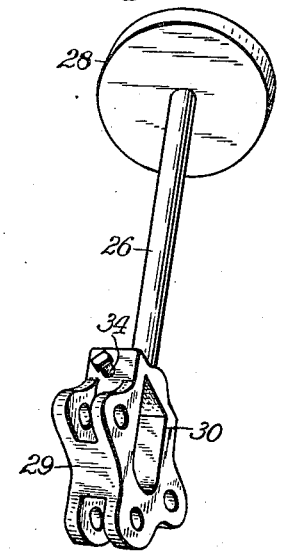

Referring to the drawings, Figure 1 is a plan of the improved engine; Fig. 2, an elevation of the engine with the near portions of the frame thereof broken away; Fig. 3, a plan partially broken away of the frame or bed plate of the engine; Fig. 4, a perspective view of one of the engine pistons and its rod and also a coupling head whereby all the piston rods are connected with a single crank pin; Fig. 5, a section on the line A A in Fig. 1; Fig. 6, a fragmentary section on the line B B in Fig. 5; Fig. 7, a plan of the fluid controlling valve; Fig. 8, a plan view of one of the valve seats for the controlling valve; Fig. 9, a fragmentary section approximately on the line C C in Fig. 1; Fig. 10, an end elevation of one of the engine cylinders; Fig. 11, a transverse section of the cylinder on the line D D in Fig. 8; Fig. 12, a central section of one of the valve chests for a controlling valve; Fig. 13, a fragmentary section on the line E E in Fig. 9; Fig. 14, a fragmentary section on the line F F in Fig. 9, and Fig. 15, an inverted plan of the valve chest.

Similar reference characters in the different figures of the drawings indicate corresponding elements or features of construction hereinafter referred to.

As preferably constructed the improved engine comprises a substantially flat bed plate 1 having a suitable number of bolt holes 2, 2′, therein to receive securing bolts, the bed plate having a broad continuous flange 3 on its edge, the whole constituting the frame, the middle portion of the bed plate having a suitable journal box 4, therein in which a main shaft 5 is rotatably mounted, the shaft having a crank disk or arm 6 thereon adjacent the bed plate provided with a crank pin 7. The bed plate has four apertures 8, 9, 10, 11, therein spaced equidistantly apart and equidistant from the main shaft to receive the trunnions of the oscillating cylinders. The flange portion 3 of the frame has a corresponding number of projections 12, 13, 14, 15, on the inner side thereof in proximity to the apertures. Four cylinders 16, 17, 18 and 19 are employed, all being of identical construction and the rear side of each cylinder has a centrally arranged trunnion 20 thereon, each trunnion being rotatably mounted in an aperture in the bed plate, each aperture preferably having a journal box 21 secured therein in which the trunnion is directly supported. Each cylinder, as will be understood, includes a head 22 provided with a packing box 23, and also a head 22′. There are four piston rods 24, 25, 26 and 27, one for each cylinder, to operate as usual through the packing box of the head 22 of the cylinder, the inner end of each piston rod having a piston 28 thereon which operates in the cylinder. One of the piston rods, 26, has a coupling head 29 fixed on its outer end and the coupling head has an aperture 30 therein in which are two parts 31 and 32 of a boxing or "brass," which parts together embrace the crank pin 7, and lost motion is taken up by means of a taper key 33 and a key bolt 34, or otherwise as may be preferred.

The coupling head is provided with 3 wrist pins 35, 36 and 37 to which the remaining piston rods 24, 25 and 27 are connected, respectively. The front side of the wall of each cylinder has a concave valve seat 38 formed thereon, and two admission ports 39 and 40 extend from the valve seat to the two opposite ends respectively of the cylinder, the middle portion of the valve seat having an exhaust port 41 therein that is arranged between the two admission ports. The port 41 communicates with a port 42 extending outward to the atmosphere. An annular guide wall 43 is formed around the edge of the valve seat for guiding the controlling valve, the inner face of the wall being concentric to the axis of the trunnion 20 of the cylinder.

Each cylinder has a valve chest 44 thereon which is seated on the guide wall 43 and suitably secured thereto preferably by means of a union nut 45, the valve chest having a packing box 46 thereon in the bottom of which is a cylindrical opening 47 that is in alinement with the trunnion, the packing box having a packing nut 48 thereon. Each valve chest is provided with a nipple 49 thereon through which to receive compressed air or steam.

Each valve seat 38 has a controlling valve 50 thereon which has a conical or convex valve face 51, there being an exhaust cavity in the valve face comprising two branches 52 and 53 that extend from the middle portion of the valve face convergently toward the edge thereof at obtuse angles, and the valve has two admission ports 54 and 55 that extend through it at a suitable distance from the sides of the branches of the exhaust cavity. Each valve is provided with a central stem 56 that is rotatably arranged in the opening 47 and extends through the packing box of the valve chest. There being four valve stems, four valve holding arms 57, 58, 59 and 60 are provided, the arms being all alike and are connected to the projections 12, 13, 14 and 15 respectively, the arms being fixedly connected to the valve stems, one for each stem, so that while the cylinders oscillate and move the valve seats and the valve chests, the valves are prevented from moving and therefore are substantially stationary and control the admission and exhaust of the motive fluid employed.

In order to conduct the motive fluid to the valve chests flexible conduits 61 and 62 are connected with the nipples 49 of two of the valve chests and are connected with a lateral conduit 63, two other flexible conduits 64 and 65 being connected with the nipples of the remaining two valve chests and are connected with a lateral conduit 66, the conduits 63 and 66 being connected with a supply pipe 67 to receive and conduct the fluid to the various valve chests.

In practical use the engine frame is stationarily supported. The compressed air or steam to be used as the motive force is admitted through the supply pipe 67 to all the valve chests. The arrangement is such that at least one and sometimes two of the cylinders must be in proper position when at rest to receive the fluid to act on the piston therein. It follows therefore that the engine may always be promptly started by the fluid. The thrust of the piston rods is directed to the crank pin relatively closely to the crank disk, since the coupling head 29 obviates the necessity of providing an excessively long crank pin to accommodate the plurality of connections for the piston rods. While the cylinders oscillate in operation the fluid controlling valves remain stationary, so that the ports 39 and 40 are alternately brought to the ports 54 and 55 respectively to admit fluid into the opposite ends of the cylinder, and to the branches 52 and 53 respectively to permit the exhaust of the fluid. In Fig. 5 the ports to the cylinders are closed, the valves not having any lead, the position of the valve being more clearly seen in Fig. 6, and it will be understood that the valves may be adjusted to provide lead if desired. In Fig. 9 the port 39 is supposed to be conducting the fluid to the cylinder while the exhaust is taking place through the port 40 and branch 53 of the exhaust cavity, the relative position of the valve being clearly shown in Fig. 14. It will be understood that the engine always turns in one direction when the valve mechanism is constructed and arranged as illustrated.

Having thus described the invention, what is claimed as new is—

1. In an engine, the combination of a bed plate, a main shaft rotatably mounted centrally in the bed plate and having a crank pin, four cylinders mounted to oscillate on the bed plate, two of the cylinders being on opposite sides of the main shaft, the remaining two cylinders being on two other opposite sides of said shaft, a piston rod movable in one of the cylinders, a coupling head rigidly fixed on the piston rod and having an aperture therein, said head having also three wrist pins therein adjacent to the aperture and opposite the remaining three cylinders, respectively, a boxing embracing the crank pin and secured in said aperture, and three piston rods movable in said remaining cylinders respectively and connected respectively to the said wrist pins.

2. In an engine, the combination of a frame, a crank shaft rotatably mounted in the frame, four cylinders arranged about the crank shaft, each cylinder having a trunnion rotatably mounted in the frame and having also a valve chest thereon, four pistons movable in the four cylinders respectively and operatively connected with the crank shaft, and a supply pipe terminating in proximity to the end of the crank shaft and having two branches extending in opposite directions each toward a point between two different ones of the valve chests, each branch having two branches thereon that are connected each to a different adjacent one of the valve chests.

3. In an engine, the combination of a pivoted cylinder having a concave valve seat on the wall thereof and ports extending from the cylinder, the cylinder wall having an annular guide wall thereon extending about the edge of said seat concentrically to the axis of the cylinder pivot, the concavity of said seat being greatest on said axis, a piston movable in the cylinder, a valve chest seated on said guide wall, a union nut screwed onto said guide wall and engaging said chest, a valve having a conical face rotatably guided on said seat for opening or closing said ports, said valve being partially guided by said guide wall and partially by said chest and having a central stem thereon extending 'through the chest, and a supply pipe connected to said chest.

In testimony whereof, we affix our signatures in presence of two witnesses.

NELSON B. MITCHELL.
JOHN W. TAGGART, Sr.

Witnesses:
HARRY D. PIERSON,
E. T. SILVIUS.